(12) United States Patent
Qumei

(10) Patent No.: US 7,669,195 B1
(45) Date of Patent: Feb. 23, 2010

(54) ELECTRONIC DEVICE NETWORK SUPPORTING COMPRESSION AND DECOMPRESSION IN ELECTRONIC DEVICES AND UPDATE GENERATOR

(75) Inventor: Iyad Qumei, Huntington Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 10/909,519

(22) Filed: Aug. 2, 2004

Related U.S. Application Data

(60) Provisional application No. 60/491,831, filed on Jul. 31, 2003, provisional application No. 60/523,402, filed on Nov. 19, 2003.

(51) Int. Cl.
*G06F 9/44* (2006.01)
(52) U.S. Cl. .................. 717/170; 717/175; 709/247
(58) Field of Classification Search ......... 717/168–172; 709/247
See application file for complete search history.

(56) References Cited

U.S. PATENT DOCUMENTS

| | | | | |
|---|---|---|---|---|
| 5,261,055 | A | | 11/1993 | Moran et al. ................. 395/275 |
| 5,394,534 | A | * | 2/1995 | Kulakowski et al. ......... 711/112 |
| 5,442,771 | A | | 8/1995 | Filepp et al. ................. 395/650 |
| 5,479,637 | A | | 12/1995 | Lisimaque et al. ........... 395/430 |
| 5,579,522 | A | | 11/1996 | Christeson et al. ........... 395/652 |
| 5,596,738 | A | | 1/1997 | Pope ........................... 395/430 |
| 5,598,534 | A | | 1/1997 | Haas ...................... 395/200.09 |
| 5,600,844 | A | * | 2/1997 | Shaw et al. ................. 715/500 |
| 5,608,910 | A | | 3/1997 | Shimakura ................... 395/670 |
| 5,623,604 | A | | 4/1997 | Russell et al. ............ 395/200.1 |
| 5,666,293 | A | | 9/1997 | Metz et al. ............... 395/200.5 |
| 5,752,039 | A | | 5/1998 | Tanimura .................... 395/712 |
| 5,778,440 | A | | 7/1998 | Yiu et al. ..................... 711/154 |
| 5,790,974 | A | | 8/1998 | Tognazzini .................. 701/204 |
| 5,848,064 | A | * | 12/1998 | Cowan ........................ 370/338 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Wei Y Zhen
*Assistant Examiner*—Phillip H Nguyen

(57) ABSTRACT

Disclosed herein is an electronic device network including a plurality of electronic devices. The electronic devices may each have software adapted to update firmware/software resident in the electronic device in compressed form. The software adapted to update firmware/software may also be adapted to employ the decompressed firmware/software components in conjunction with additional update information in performing an update on the electronic devices. An update generator in the electronic device network may be adapted to employ compression and decompression techniques upon generated updates for use in updating the electronic devices. The update generator may also be adapted to generate update packages using the decompressed update information. The update generator may also be adapted to selectively compress the generated update packages usable for updating the electronic devices prior to the update package being transmitted to eth electronic device.

29 Claims, 9 Drawing Sheets

U.S. PATENT DOCUMENTS

| | | | | |
|---|---|---|---|---|
| 5,878,256 | A | 3/1999 | Bealkowski et al. | 395/652 |
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,106,570 | A * | 8/2000 | Mizuhara | 717/169 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,308,061 | B1 * | 10/2001 | Criss et al. | 455/418 |
| 6,311,322 | B1 | 10/2001 | Ikeda et al. | 717/1 |
| 6,425,125 | B1 * | 7/2002 | Fries et al. | 717/168 |
| 6,438,585 | B2 | 8/2002 | Mousseau et al. | 709/206 |
| 6,496,979 | B1 * | 12/2002 | Chen et al. | 717/178 |
| 6,643,506 | B1 * | 11/2003 | Criss et al. | 455/419 |
| 6,735,434 | B2 * | 5/2004 | Criss et al. | 455/418 |
| 6,832,373 | B2 * | 12/2004 | O'Neill | 717/171 |
| 6,836,657 | B2 * | 12/2004 | Ji et al. | 455/419 |
| 6,952,823 | B2 * | 10/2005 | Kryloff et al. | 717/170 |
| 6,968,184 | B2 * | 11/2005 | Criss et al. | 455/418 |
| 6,979,253 | B2 * | 12/2005 | Thyssen | 451/147 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2004/0034765 | A1 * | 2/2004 | James | 713/1 |
| 2005/0091501 | A1 * | 4/2005 | Osthoff et al. | 713/181 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

Firmware Build Process incorporating Enciphering Compressed Firmware Components

Generator Updating Firmware Images Using Compressed Firmware Images

Modified Update Agent Fault Tolerant Procedure Managing
Compressed Firmware Images

ELECTRONIC DEVICE NETWORK SUPPORTING COMPRESSION AND DECOMPRESSION IN ELECTRONIC DEVICES AND UPDATE GENERATOR

CROSS-REFERENCE TO RELATED APPLICATIONS

The present application makes reference to, claims priority to, and the benefit of U.S. Provisional Patent Application 60/491,831 entitled "MOBILE HANDSET NETWORK WITH SUPPORT FOR COMPRESSION AND DECOMPRESSION IN THE MOBILE HANDSET AND GENERATOR", filed Jul. 31, 2003, the complete subject matter of which is hereby incorporated herein by reference in its entirety.

The present application makes reference to, claims priority to, and the benefit of U.S. Provisional Patent Application 60/523,402 entitled "MOBILE HANDSET NETWORK WITH SUPPORT FOR COMPRESSION AND DECOMPRESSION IN THE MOBILE HANDSET", filed Nov. 19, 2003, the complete subject matter of which is hereby incorporated herein by reference in its entirety.

The present application also hereby incorporates herein by reference in its entirety, the complete subject matter of PCT Application having publication number WO 02/41147 A1 and PCT application number PCT/US01/44034, filed on Nov. 19, 2001.

The present application also hereby incorporates herein by reference in its entirety, the complete subject matter of U.S. Provisional Patent Application 60/249,606 filed on Nov. 17, 2000.

The present application also hereby incorporates herein by reference in its entirety, the complete subject matter of U.S. Provisional Patent Application 60/422,048, filed Oct. 29, 2002.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and/or software applications that are either provided by the manufacturers of the electronic devices, by telecommunication carriers, or by third parties. These firmware and software applications often contain bugs. New versions of firmware and software are periodically released to fix the bugs and/or to introduce new features.

Generating update packages in an efficient mode when at least a portion of the update information to be updated is compressed and/or encrypted may be challenging. Updating code (e.g., firmware or software components) in electronic devices when the code to be updated is compressed may also be challenging.

Update programs, code, or functions employed to update the firmware and/or software components in electronic devices may also need to be changed, modified, and/or updated. However, portions or blocks of the information being updated may not fit into the memory available in the electronic device during an update. Changes to firmware and/or software components may need to be performed in a fault tolerant mode, however a fault tolerant update may be difficult to implement.

Electronic devices may employ non-volatile memory to store code and/or data. Sometimes, more than one type of memory device may be employed. Updating code and/or data distributed across multiple memory devices and memory device-types may be difficult, especially, if the memory devices are produced by different manufacturers.

Further limitations and disadvantages of conventional and traditional approaches will become apparent to one of ordinary skill in the art through comparison of such systems with the present invention as set forth in the remainder of the present application with reference to the drawings.

SUMMARY OF THE INVENTION

Aspects of the present invention may be found in a method of updating a mobile electronic device associated with a communications network. The method may comprise generating an update comprising at least one update block of update information for updating at least one of firmware and software in the mobile electronic device, compressing the generated update, and transmitting the update to the mobile electronic device. The update information may comprise a set of executable instructions for converting the at least one of firmware and software from a first version to a second version in the mobile electronic device. At least a portion of the at least one of firmware and software may be stored in a compressed form in the mobile electronic device.

In an embodiment according to the present invention, at least a portion of the at least one of firmware and software to be updated may be decompressed in the mobile electronic device before updating the at least a portion at least one of firmware and software.

In an embodiment according to the present invention, the method may further comprise receiving and storing the update in the mobile electronic device in a compressed form.

In an embodiment according to the present invention, the method may further comprise decompressing the update in the mobile electronic device before updating the firmware/software.

In an embodiment according to the present invention, the method may further comprise updating at least one decompressed block of the at least one of firmware and software with a decompressed update block in the mobile electronic device.

In an embodiment according to the present invention, the method may further comprise enciphering the compressed update prior to transmitting the update to the electronic device.

In an embodiment according to the present invention, the method may further comprise decompressing the update one block at a time in the mobile electronic device.

In an embodiment according to the present invention, the method may further comprise decompressing the at least a portion of the at least one of firmware and software to be updated one block at a time in the mobile electronic device.

In an embodiment according to the present invention, the method may further comprise compressing a block of firmware/software after the block is updated.

In an embodiment according to the present invention, the method may further comprise compressing the updated block of the at least a portion of the at least one of firmware and software into a location where the block of firmware/software originated before being updated.

Aspects of the present invention may be found in a method of updating compressed information in an electronic device. The method may comprise decompressing a compressed block of information to be updated, decompressing a compressed update block to be used to update the compressed block of information, updating the decompressed block of information with the decompressed update block, and compressing the updated block of information.

In an embodiment according to the present invention, the method may further comprise decompressing a plurality of blocks of information and a plurality of update blocks.

In an embodiment according to the present invention, updating the decompressed block of information may comprise performing a calculation employing information in the update block and the block to be updated and modifying contents of the block of information based upon the calculation results.

In an embodiment according to the present invention, performing a calculation may comprise calculating binary differencing information between the contents of the block to be updated and the update block.

In an embodiment according to the present invention, updating the block of information may comprise modifying at least a portion of the contents of the block of information with updated information.

In an embodiment according to the present invention, decompressing the block of information to be updated may comprise adjusting one of a size or length of the block of information during decompression.

In an embodiment according to the present invention, decompressing the update block may comprise adjusting one of a size and length of the update block during decompression.

In an embodiment according to the present invention, compressing the updated block of information may comprise adjusting one of a size and length of the updated block of information during compression.

In an embodiment according to the present invention, updating at least a portion of decompressed contents of the at least one block of information may comprise using a set of executable instructions to convert the at least a portion of decompressed contents to an updated contents.

Aspects of the present invention may be found in a method of fault tolerant updating of compressed information in an electronic device. The method may comprise decompressing a compressed block of information to be updated, decompressing a compressed update block to be used to update the compressed block of information, and compressing the updated block of information.

In an embodiment according to the present invention, the method may further comprise decompressing a plurality of blocks of information and a plurality of update blocks.

In an embodiment according to the present invention, the method may further comprise updating the decompressed block of information by employing the decompressed update block.

In an embodiment according to the present invention, updating the decompressed block of information may comprise performing a calculation employing information in the decompressed update block and the block of information to be updated and modifying contents of the block of information based upon the calculation results.

In an embodiment according to the present invention, performing a calculation may comprise calculating binary differencing information between the contents of the block to be updated and the update block.

In an embodiment according to the present invention, updating the block of information may comprise modifying at least a portion of the contents of the block of information with updated information.

In an embodiment according to the present invention, decompressing the block of information to be updated comprises adjusting one of a size and length of the block of information during decompression.

In an embodiment according to the present invention, decompressing the update block may comprise adjusting one of a size and length of the update block during decompression.

In an embodiment according to the present invention, compressing the updated block of information may comprise adjusting one of a size and length of the updated block of information during compression.

In an embodiment according to the present invention, updating at least a portion of decompressed contents of the at least one block of information may comprise using a set of executable instructions to convert the at least a portion of decompressed contents to an updated contents.

Aspects of the present invention may be found in an electronic device network for updating at least one of firmware and software in a plurality of electronic devices using at least one electronic device update. At least one of the firmware and software in the plurality of electronic devices and the at least one update may be compressed. The network may comprise at least one update generator adapted to generate updates. The at least one update generator may comprising a compression/decompression engine. The system may also comprise at least one update store storing a plurality of electronic device updates and at least one update delivery server adapted to dispense the plurality of electronic device updates.

In an embodiment according to the present invention, the at least one update delivery server may comprise secure sockets layer support providing authentication and data encryption/decryption.

In an embodiment according to the present invention, each of the plurality of electronic devices may be adapted to retrieve compressed updates from the at least one update delivery server to update the at least one of firmware and software resident in the plurality of electronic devices. At least a portion of the at least one of firmware and software resident in the electronic devices may be compressed.

In an embodiment according to the present invention, each of the plurality of electronic devices may comprise compression and decompression components, and a client for downloading compressed updates.

In an embodiment according to the present invention, each of the plurality of electronic devices comprises a compressed section. The compressed section may comprise at least one of a compressed data section and a compressed code section.

In an embodiment according to the present invention, each of the plurality of electronic devices may comprise at least one of a random access memory, a provisioned data section, an operating system, an update agent, and an update application loader. The provisioned data section may comprise an update agent provisioning information section and a number assignment module.

In an embodiment according to the present invention, the update agent may be adapted to employ compression/decompression components to update at least one of firmware and software resident in the electronic devices. At least a portion of the at least one of firmware and software may be compressed and stored in one of a compressed data section and a compressed code section.

In an embodiment according to the present invention, the update generator may be adapted to process an old memory image and a new memory image of the at least one of firmware and software in the electronic devices. At least a portion of the at least one of firmware and software may be compressed.

In an embodiment according to the present invention, the update generator may be adapted to decompress one of the compressed data segments and compressed code in both an old memory image and a new memory image to generate a compressed update for updating at least one of firmware and software in the electronic devices.

In an embodiment according to the present invention, the update generator may be adapted to employ compression/decompression algorithms to process the one of compressed code and compressed data segments to generate a compressed update comprising difference information, compress the code and data segments, and compress difference information in at least one compressed update.

In an embodiment according to the present invention, the electronic devices may comprise a plurality of mobile electronic devices. The plurality of mobile electronic devices may comprise at least one of a mobile cellular phone handset, personal digital assistant, pager, a multimedia player, and a camera.

In an embodiment according to the present invention, the update generator may comprise one of a unitary decompression/compression engine and a separate decompression engine and a separate compression engine.

These and other advantages, aspects, and novel features of the present invention, as well as details of illustrated embodiments, thereof, will be more fully understood from the following description and drawings.

DETAILED DESCRIPTION OF THE INVENTION

Figure 1:
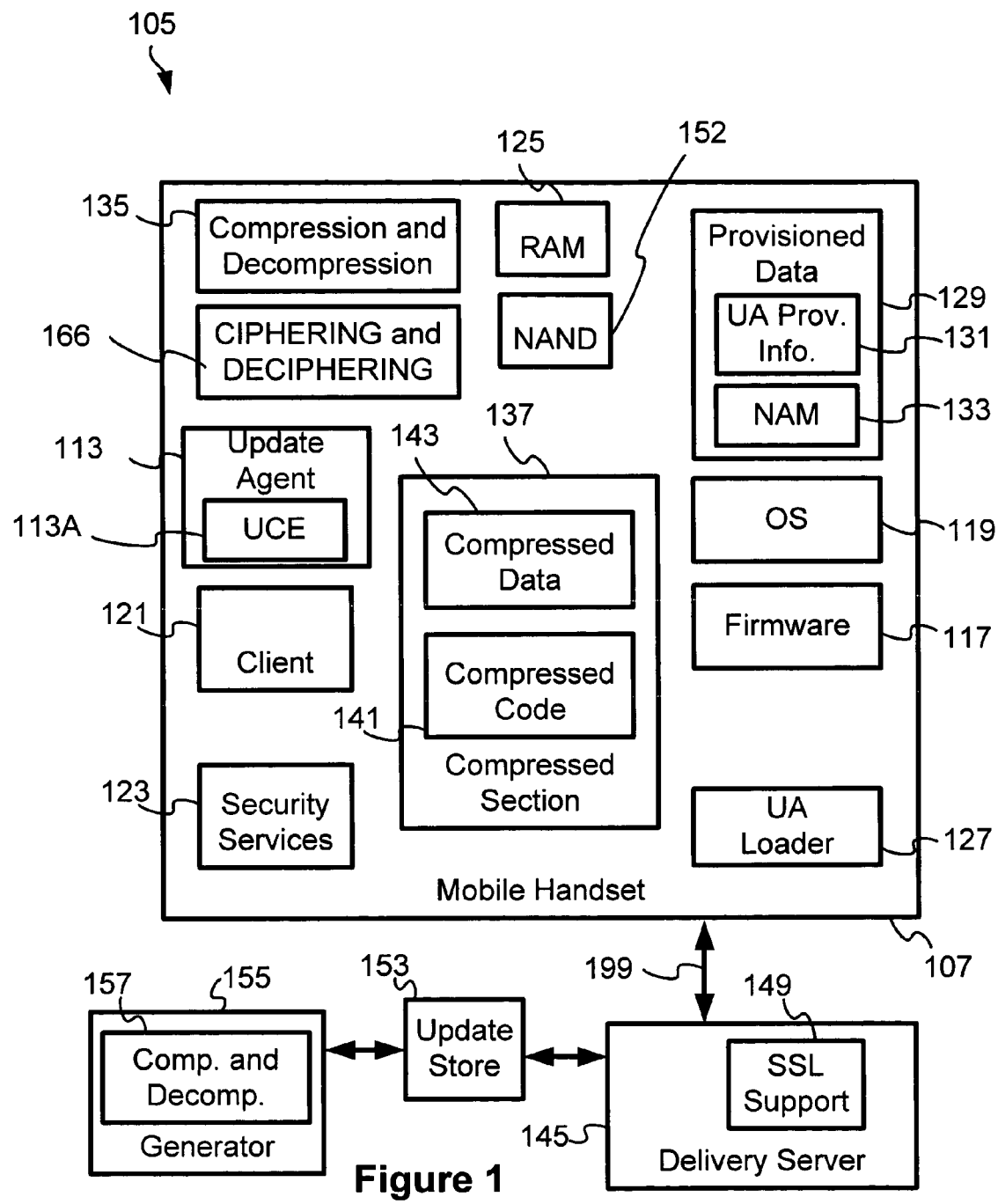
FIG. 1 is a block diagram illustrating an exemplary electronic device network adapted to employ compression and decompression techniques during an update of partially or totally compressed firmware and/or software components in electronic devices in accordance with an embodiment of the present invention.

Electronic devices may be adapted to access servers to retrieve update information for updating electronic devices. An electronic device may be, for example, a mobile electronic device having software/firmware, such as, mobile cellular phone handsets, personal digital assistants (PDA's), pagers, MP3 players, digital cameras, etc. Update information may comprise information that modifies, converts, or changes firmware and/or software components installed in the mobile electronic device. Update information may also add new services to the mobile electronic device, as desired by a service provider, device manufacturer, or an end-user.

Aspects of the present invention may be found in a fault tolerant method of updating a compressed information file. The compressed information file may be stored in compressed form in a non-volatile memory device, for example, a flash memory device. The compressed information file may comprise code and/or data. The memory may be erased before reprogramming. The memory may be overwritten, without being erased, during updating and/or reprogramming.

In an embodiment according to the present invention, a fault tolerant method may comprise preventing loss of information, in the event that power failure occurs during a reprogramming event. In an embodiment according to the present invention, a fault tolerant method may comprise ensuring continuity of an updating and/or reprogramming procedure, in the event that power failure occurs during the updating and/or reprogramming procedure.

Information residing in the electronic devices to be updated may comprise code and/or data. The code and/or data may be organized/arranged in units or blocks of information. The blocks of information may also be called banks, compressed units/blocks, and decompressed units/blocks herein. In an embodiment according to the present invention, the size of a particular memory block in non-volatile memory may be fixed and may be a parameter of a manufacturer's hardware configuration of an electronic device. The size of a plurality of memory blocks may be uniform, i.e., all blocks having an identical size, for example. In an embodiment according to the present invention, the size of a particular memory block usable for updating may be variable according to the demands placed upon the memory during a processing/updating event.

In an embodiment according to the present invention, a compressed unit/block may comprise a set of compressed code/data. In an embodiment according to the present invention, compression and decompression of the code/data may be performed independently, for example, one block or unit at a time. In an embodiment according to the present invention, several or all of the blocks may be compressed and decompressed simultaneously. The size of a compressed unit/block may be arranged according to particular electronic device memory constraints. The electronic device memory may be arranged as a single block of memory or a plurality of memory sub-blocks.

In an embodiment according to the present invention, a decompressed unit/block may comprise a logical block of memory in random access memory (RAM). When a compressed unit/block is decompressed from non-volatile memory (NVM) into RAM, the block may be designated an updatable decompressed unit/block because the decompressed block may be changed, modified, overwritten, and/or updated. Updates may be performed on decompressed blocks of information, thus the decompressed blocks are updatable.

In an embodiment according to the present invention, an update generator may be adapted to generate an update unit/block or a set comprising a plurality of update unit/blocks for use in updating one of firmware and/or software in electronic devices. An update block/unit may be defined as a block containing information usable to update a decompressed block of information to be updated. Each update unit/block may have the same length (be uniform in size) or a different size or length, i.e., the amount of decompressed information resident in each update unit/block may vary from block to block. Each compressed block may comprise a uniform length. Each decompressed block may comprise a different size or length with respect to other decompressed blocks. Each update unit/block may have a variable size or length.

An update (update package) may comprise a firmware/software update that may be used to modify or change a version of a particular firmware/software, for example, upgrading to a newer version. The information in the update package may comprise, for example, a set of executable instructions for converting a first version of firmware/software ("code") to a second version of code. In an embodiment according to the present invention, an update package may also add new services to the electronic device or delete services, as desired by the service provider or an end-user. An update package may also be referred to in abbreviated form herein as an update.

In an embodiment according to the present invention, an electronic device network adapted to support a plurality of electronic devices may comprise an update generator. The update generator may be adapted to generate updates (update packages) comprising a plurality of update units/blocks. In an embodiment according to the present invention, generating an update comprising units/blocks may comprise overwriting decompressed information resident in an existing/previous update units/blocks with new or different (updated) information. An update package may be built using a plurality of decompressed blocks of update information.

An update (update package) generated by the update generator in the electronic device network may be compressed for transmission to a plurality of electronic devices having firmware/software to be updated. The update generator may comprise a compression/decompression engine adapted to compress generated update packages and decompress update blocks comprising update information usable to generate the update package.

In an embodiment according to the present invention, the update generator may be adapted to generate update units/blocks comprising a plurality of non-uniform (i.e., variable) sizes. The ability of the update generator to generate update units/blocks is not hampered by the update units/blocks comprising variable amounts of decompressed information (i.e., those having variable size or length) from block to block.

In an embodiment according to the present invention, the update generator may also be adapted to determine different split boundaries between individual update units/blocks. For example, a different split boundary may be employed after the update units/blocks have been generated in order to permit the variable-sized generated update blocks to be compressed into blocks of uniform size for storage in non-volatile memory (NVM). The size of a block to be stored in the NVM may be established in accordance with electronic device specifications or by the particular non-volatile memory device specifications.

FIG. 1 is a block diagram illustrating an exemplary electronic device network, for example, mobile handset network 105, adapted to employ compression and decompression techniques to update partially or totally compressed firmware 117 and/or software in electronic devices, for example, mobile handset 107, in accordance with an embodiment of the present invention. The network may also be adapted to generate updates usable to update firmware and/or software in the mobile electronic devices.

The updates may comprise a plurality of blocks of update information. During generation of an update, the update information may be decompressed, update blocks may be created, and the update blocks may be compressed for transmission via a wireless communication connection, for example to the electronic devices to be updated.

At the electronic devices, the compressed update package may be stored in compressed form in non-volatile memory in the electronic devices. The firmware/software to be updated may also be stored in compressed form in the electronic devices.

During an update procedure, the update package and the firmware/software to be updated may be decompressed into RAM. The update may be performed on the firmware/software to be updated.

After update completion, the updated firmware/software may be compressed into non-volatile memory for storage. The update package may be overwritten or erased after update completion.

In FIG. 1, the electronic device network, for example, the mobile handset network 105, may be adapted to employ compression and decompression techniques. The electronic device network, for example, mobile handset network 105 may comprise an update generator 155 capable of generating updates that may be employed to update firmware 117 and/or software components in electronic devices, for example, mobile handset 107. The update generator 155 may comprise a combined compression and decompression engine 157. In an embodiment according to the present invention, the update generator 155 may also comprise a separate compression engine and a separate decompression engine.

The electronic device network, for example, mobile handset network 105, may also comprise an update store 153 operatively connected to the update generator 155. The update store 153 may be adapted to serve as a repository for one or a plurality of partially or wholly generated updates. The generated updates may be compressed or decompressed depending upon electronic device requirements and/or transmission requirements. The electronic device network, for example, mobile handset network 105, may also comprise a delivery server 145 adapted to transmit generated updates via a communication link 199 to a plurality of electronic devices, for example, mobile handset 107. The delivery server 145 may be operatively connected to the update store 153 and therefore also to the update generator 155 according to an embodiment of the present invention.

The operative connections between update generator 155, the update store 153, and the delivery server 145 illustrated in FIG. 1, are exemplary and other connective arrangements may also be employed. The communications link 199 may, for example, comprise at least one of a wire, a cable, an optical fiber, and a wireless connection, for example. The delivery server 145 may also comprise a secure socket layer (SSL) support engine 149 for ensuring secure communication between the delivery server 145 and a plurality of electronic devices, for example, mobile handset 107.

In an embodiment according to the present invention, an electronic device, for example, mobile handset 107 may be adapted to request, retrieve, and receive generated updates from the delivery server 145 to update firmware 117 and/or software components resident in the electronic device. The update may be received in compressed or decompressed form depending upon electronic device requirements and/or transmission requirements. In an embodiment according to the present invention, at least a portion of firmware 117 and/or software components resident in the electronic device to be updated may be compressed. In an embodiment according to the present invention, at least a portion of firmware 117 and/or software components resident in the electronic device to be updated may be enciphered.

In an embodiment according to the present invention, compression/decompression algorithms may be installed in the electronic devices, for example, mobile handset 107. The installed compression/decompression algorithms may be implemented in one of hardware and firmware/software in an embodiment according to the present invention. The installed compression/decompression algorithms may be implemented in firmware 117 and/or software components in another embodiment according to the present invention.

In an embodiment according to the present invention, the compression/decompression algorithms may be employed to decompress compressed blocks of information (data/code) that may be stored in one of the compressed data section 143 and the compressed code section 141, respectively, in compressed section 137. The decompressed blocks of code and/or data may be updated in RAM 125 using an update comprising update blocks comprising update information downloaded or otherwise transferred to the electronic device, for example, mobile handset 107. The update may also be decompressed if received and/or stored in the electronic device in compressed form. Once the decompressed blocks of information (code and/or data) are updated, (e.g., updates may be performed in a fault tolerant mode), the updated blocks of information may be compressed again and stored in non-volatile memory in the electronic device.

In an embodiment according to the present invention, fault tolerant updating of firmware 117 and/or software components comprising compressed code and/or compressed data segments may be conducted in the electronic device, for example, mobile handset 107. A fault tolerant update agent, for example, update agent 113, may be employed to update the firmware 117 and/or software components in electronic devices, for example, mobile handset 107. An update agent may be defined as software adapted to update one of firmware/software.

In an embodiment according to the present invention, the compression/decompression algorithms may be embedded in a compression/decompression component 135 accessible by the update agent 113 in the electronic device, for example, mobile handset 107. In an embodiment according to the present invention, the compression/decompression components 135 may also comprise a software engine accessible by the update agent 113 in the electronic device.

In an embodiment according to the present invention, the compression/decompression algorithms may also reside in compression/decompression component 157 in update generator 155 in the electronic device network. In an embodiment according to the present invention, the compression/decompression components 157 may also comprise a software engine accessible by the update generator 157 in the electronic device network.

In an embodiment according to the present invention, electronic devices, for example, mobile handset 107, may comprise compression/decompression components 135, an update download client 121, a security services component 123, and a compressed section 137. The compressed section 137 may at least comprise a compressed data section 143 and a compressed code section 141. The compressed section 137 may comprise non-volatile memory. The electronic devices, for example, mobile handset 107, may also comprise a provisioned data component 129. The provisioned data component 129 may at least comprise an update agent (UA) provisioning information section 131 and a number assignment module (NAM) 133.

In an embodiment according to the present invention, the electronic devices, for example, mobile handset 107 may also comprise an operating system (OS) 119, a firmware 117, an update agent 113, and an update application (UA) loader 127. The update agent 113 may be capable of employing the compression and decompression components 135 to decompress compressed firmware 117 and/or software components in the electronic devices, for example, mobile handset 107. The update agent 113 may be capable of employing the compression/decompression component 135 to decompress compressed updates comprising a plurality of compressed update blocks received and stored in the electronic devices, for example, mobile handset 107. The update agent 113 may be capable of employing the compression/decompression component 135 to compress updated firmware 117 and/or software in the electronic devices, for example, mobile handset 107. In an embodiment according to the present invention, at least a portion of the firmware 117 and/or software components may be compressed and reside in the compressed section 137, that may comprise a non-volatile memory. In an embodiment according to the present invention, the update agent 113 may be capable of conducting fault-tolerant updates.

In an embodiment according to the present invention, the update agent 113 may comprise an update core engine (UCE) 113A. In an embodiment according to the present invention, the compressed code stored in compressed code section 141 and the compressed data stored in compressed data section 143 may also be enciphered. The electronic device, for example, mobile handset 107 may also comprise ciphering and deciphering components 166 employable to facilitate ciphering and deciphering of firmware 117 and/or software components in the electronic devices.

In an embodiment according to the present invention, the information to be updated (firmware 117 and/or software) in an electronic device may be decompressed, deciphered, updated, enciphered, and recompressed as part of an update procedure. In an embodiment according to the present invention, the update package (update blocks to be use for updating firmware 117 and/or software) may also be enciphered.

In an embodiment according to the present invention, the update package (update blocks to be use for updating firmware 117 and/or software) may be decompressed, deciphered, and used for performing an update in the electronic device. In an embodiment according to the present invention, the update package (update blocks to be use for updating firmware 117 and/or software) may be generated, enciphered and compressed for transmission in update generator 155 in the electronic device network.

In an embodiment according to the present invention, the update generator 155 in the electronic device network may be capable of processing an old memory image (one version of firmware/software) and a new memory image (another version of firmware/software) in creating an update package. At least a portion of the firmware 117 and/or software to be updated may be compressed employing compression techniques and enciphered employing ciphering techniques. At least a portion of the firmware 117 and/or software to be updated may be decompressed employing decompression techniques and deciphered employing deciphering techniques. The compression techniques employed in the electronic device network and the electronic devices themselves may comprise, for example, zip, gzip, winzip, LZ (Lempel-Ziv) compression, etc.

In an embodiment according to the present invention, the compression/decompression engine 157 in update generator 155 may decompress the compressed data and/or code in both the old memory image and the new memory image in preparation for generating an update package usable to update a current firmware/software image in the electronic devices, for example, mobile handset 107.

In an embodiment according to the present invention, electronic devices, for example, mobile handset 107, may comprise and employ, for example, NAND-type non-volatile memory 152 (that may also be referred to as NAND-flash memory) to store data and/or code. Although the following discussion refers to the use of NAND-type non-volatile memory, this is not a limitation of the present invention.

NAND-type memory is only one form of non-volatile memory. In other embodiments of the present invention, other forms of non-volatile memory may be employed. The NAND-type non-volatile memory may be used to back up information (as a backup resource) currently being updated to ensure fault tolerant updating, i.e., avoiding loss of information and ensuring continuity of an update in the event a power failure should occur during the update procedure. The stored data and/or code may be decompressed by the compression and decompression component 135 in the electronic device, for example mobile handset 107.

In an embodiment according to the present invention, updating the code/data in the NAND-type memory 152 by update agent 113 may require retrieving and decompressing compressed components (e.g., code and/or data) one block at a time. By backing up a single block of information (e.g., code and/or data) at a time, continuity of an update in the event of a power failure during the update may be ensured. Additionally, by backing up a single block of information (e.g., code and/or data) at a time, loss of information may be avoided.

In an embodiment according to the present invention, a block of code/data (firmware/software to be updated) in the NAND-type memory 152 may be decompressed into RAM 125 and a compressed update block (usable to update a block of firmware/software) residing in a non-volatile memory may also be decompressed into RAM 125. In an embodiment according to the present invention, a block of firmware/software and an update block for updating the firmware/software may both be in the RAM 125 during an update. In an embodiment according to the present invention, the updated block of firmware/software may be compressed into the NAND-type memory 152 for subsequent restoration.

In an embodiment according to the present invention, a working bank of memory in the RAM 125 may be expanded beyond one block in length. A decompressed current block of firmware/software to be updated from the NAND-type memory 152 may occupy more than one block in RAM 125.

After update completion, the decompressed information in the block of updated firmware/software may be compressed into the original block in NAND-type memory 152.

Figure 2:
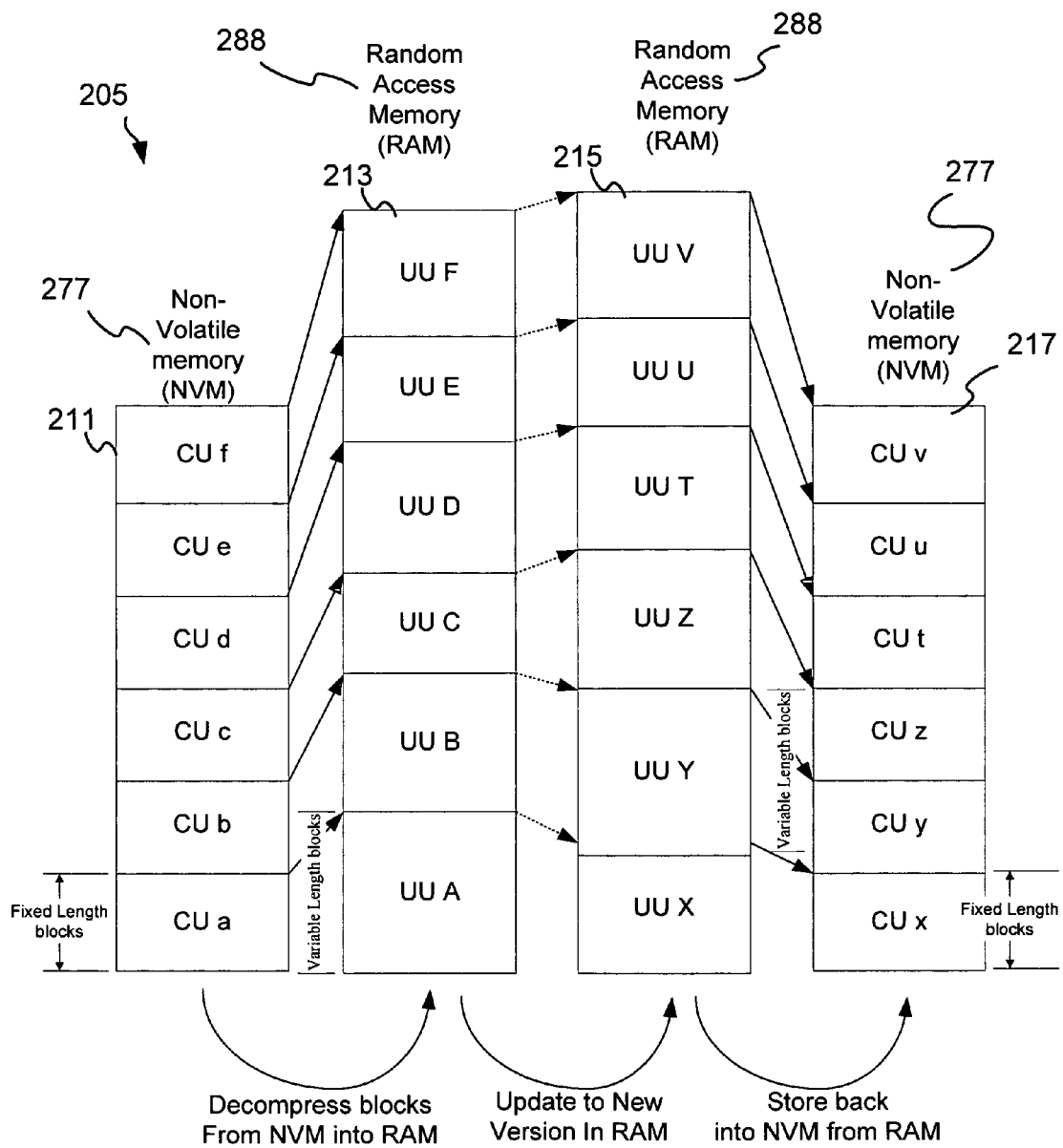
FIG. 2 is a block diagram illustrating an exemplary method of updating compressed firmware and/or software components residing in non-volatile memory in an electronic device in accordance with an embodiment of the present invention.

FIG. 2 is a block diagram 205 illustrating an exemplary method of updating compressed firmware and/or software in a mobile electronic device, for example, the mobile handset 107 illustrated in FIG. 1, in accordance with an embodiment of the present invention.

FIG. 2 illustrates a plurality of compressed blocks 211 (for example, CU a, CU b, CU c, . . . , CU f) of firmware/software comprising code/data to be updated resident in non-volatile memory (NVM) 277. The compressed blocks 211 may be decompressed from the NVM 277 into RAM 288 in the electronic device, for example, the mobile handset 107 illustrated in FIG. 1, creating a plurality of decompressed blocks 213 (for example, UU A, UU B, UU C, . . . , and UU F) of code/data able to be updated.

An update agent, for example, update agent 113 illustrated in FIG. 1, resident in the electronic device may be adapted to update the plurality of decompressed blocks 213 of firmware/software in RAM 288 by employing update information in one or more decompressed update blocks creating a plurality of updated blocks 215 of firmware/software in the RAM 288.

In an embodiment according to the present invention, the plurality of decompressed blocks 213 of firmware/software may be updated to create the plurality of updated blocks 215 of firmware/software, one block at a time. In another embodiment according to the present invention, all of the plurality of decompressed blocks 213 of firmware/software may be simultaneously updated by a plurality of decompressed update blocks creating the plurality of updated blocks 215 of firmware/software. After update completion, the updated blocks 215 of firmware/software may be compressed into units 217 (for example, CU x, CU a, . . . , CU f) in non-volatile memory 277.

In an embodiment according to the present invention, an update generator, for example, update generator 155 illustrated in FIG. 1, may be used to generate the update packages (update blocks) used to update the information in blocks of firmware/software 213.

In an embodiment according to the present invention, an update core engine, for example, UCE 113A illustrated in FIG. 1, may also be employed in the electronic device for carrying out the update procedure in conjunction with the update agent 113. In an embodiment according to the present invention, the update core engine 113A may be a component of update agent 113 illustrated in FIG. 1. In an embodiment according to the present invention, the update core engine 113A may be adapted to update blocks of firmware and/or software one block at a time.

Figure 3:
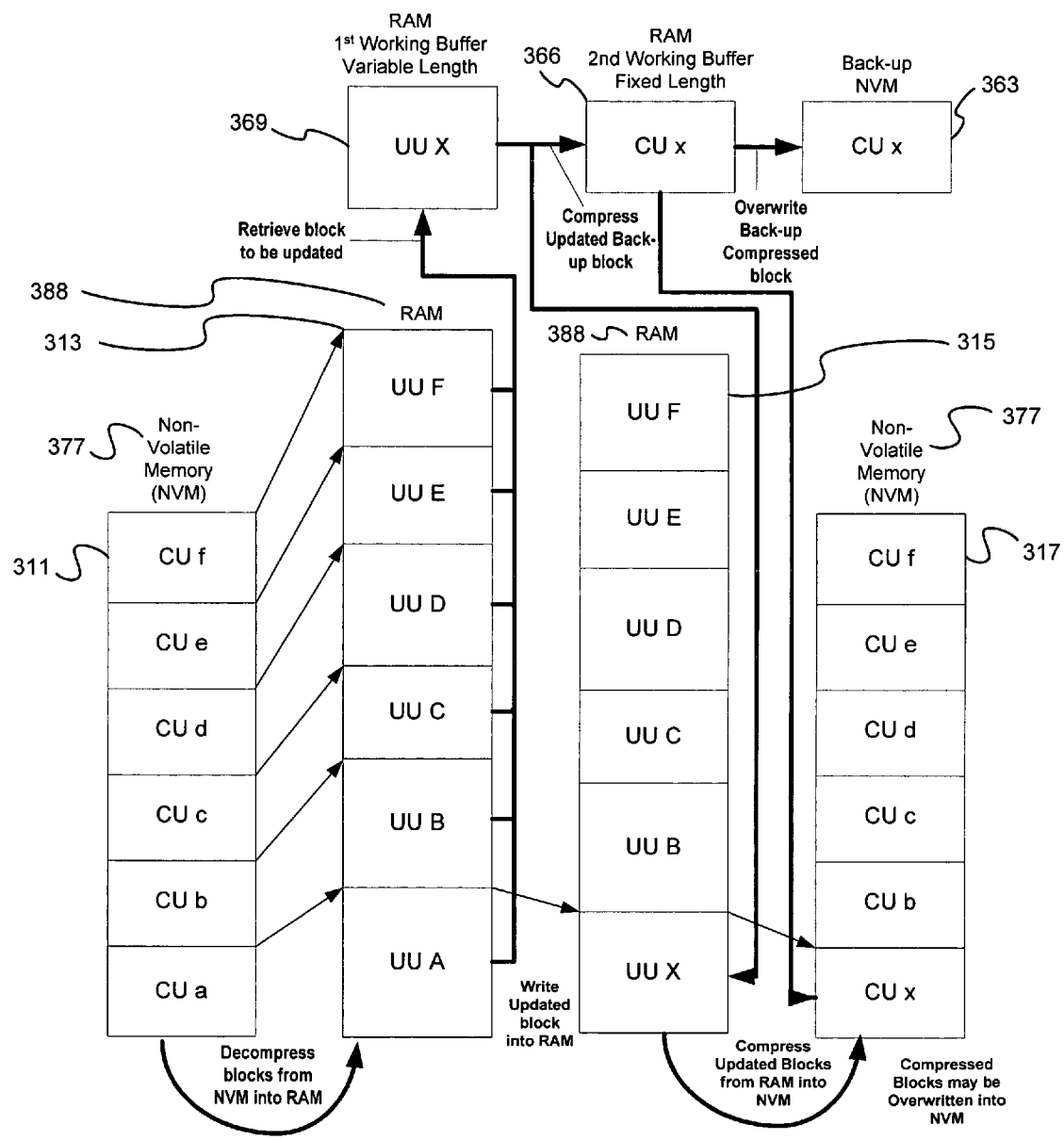
FIG. 3 is a block diagram illustrating an exemplary method of preventing loss of information and ensuring continuity of an update procedure by storing updated memory blocks in a fault tolerant manner during an update of firmware and/or software components in an electronic device in accordance with an embodiment of the present invention.

FIG. 3 is a diagram illustrating an exemplary method preventing loss of information by storing updated memory blocks in a fault tolerant manner during an update of one of firmware and/or software in an electronic device, in accordance with an embodiment of the present invention. FIG. 3 illustrates a fault tolerant update information back-up procedure.

In an embodiment according to the present invention, firmware and/or software components resident in electronic devices may be updated. In prior art electronic devices, when/if a power failure occurs during an update of an electronic device, the potential exists for information (e.g., code/data) to be lost or misplaced in the electronic device. Information residing in RAM, for example, may be particularly vulnerable because information in RAM is lost when power to the RAM is interrupted. Information residing in a non-volatile memory when/if a power failure occurs may be safely retained. However, upon power-up, the electronic device may not be able to locate, properly address, and/or identify the stored information, rendering the stored information unusable. The loss of information during an update may damage the electronic device and/or render the electronic device inoperable. In an embodiment according to the present invention, loss of update information may be prevented, by employing the fault tolerant updating method set forth herein.

Referring to FIG. 3, compressed blocks 311 (for example, CU a, CU b, CU c, . . . , CU f) of code/data residing in non-volatile memory 377 (NVM) may be decompressed from the NVM 377 to RAM 388. The compressed blocks 311 may be uniform in length. The RAM 338 may comprise a plurality of decompressed update blocks 313 (for example, UU A, UU B, UU C, . . . , WU F). The decompressed update blocks 313 may comprise various lengths.

The decompressed blocks 313 may be selected and retrieved, for example, one block at a time, from the RAM 388 and placed in a first working buffer 369 of variable length. In the first working buffer 369, the selected decompressed block 313 may be updated. In an embodiment according to the present invention, updating may comprise overwriting/modifying the entire contents of the selected decompressed block 313 in the first working buffer 369 with different/updated information. In an embodiment according to the present invention, updating may comprise overwriting a portion of the contents of the selected decompressed block 313 in the first working buffer 369 with different/updated information.

After the selected decompressed block 313 has been updated, a back-up copy of the updated block may be compressed from the first working buffer 369 to a second working buffer 366. The first working buffer 369 may comprise blocks having varying lengths to facilitate updating. The second working buffer 366 may comprise blocks having uniform lengths corresponding to the uniform length of blocks in the non-volatile memory device, for example, NVM 377. The contents of the first working buffer 369 may be compressed into the second working buffer 366, and subsequently stored into the back-up NVM 363. By saving the compressed updated block in the second working buffer 366 into the back-up NVM 363, should a power failure occur, the electronic device, upon re-boot and restart, may continue the update without loss of information and/or continuity. The update may resume where the update was abruptly interrupted by the power failure.

The updated block 315 may also be written from the first working buffer 369 into RAM 388. The compressed updated block 315 may also be stored in NVM 377. A previous block, for example, block 317 in NVM 377 may be overwritten with the compressed updated block of information stored in second working buffer 366.

Figure 4:
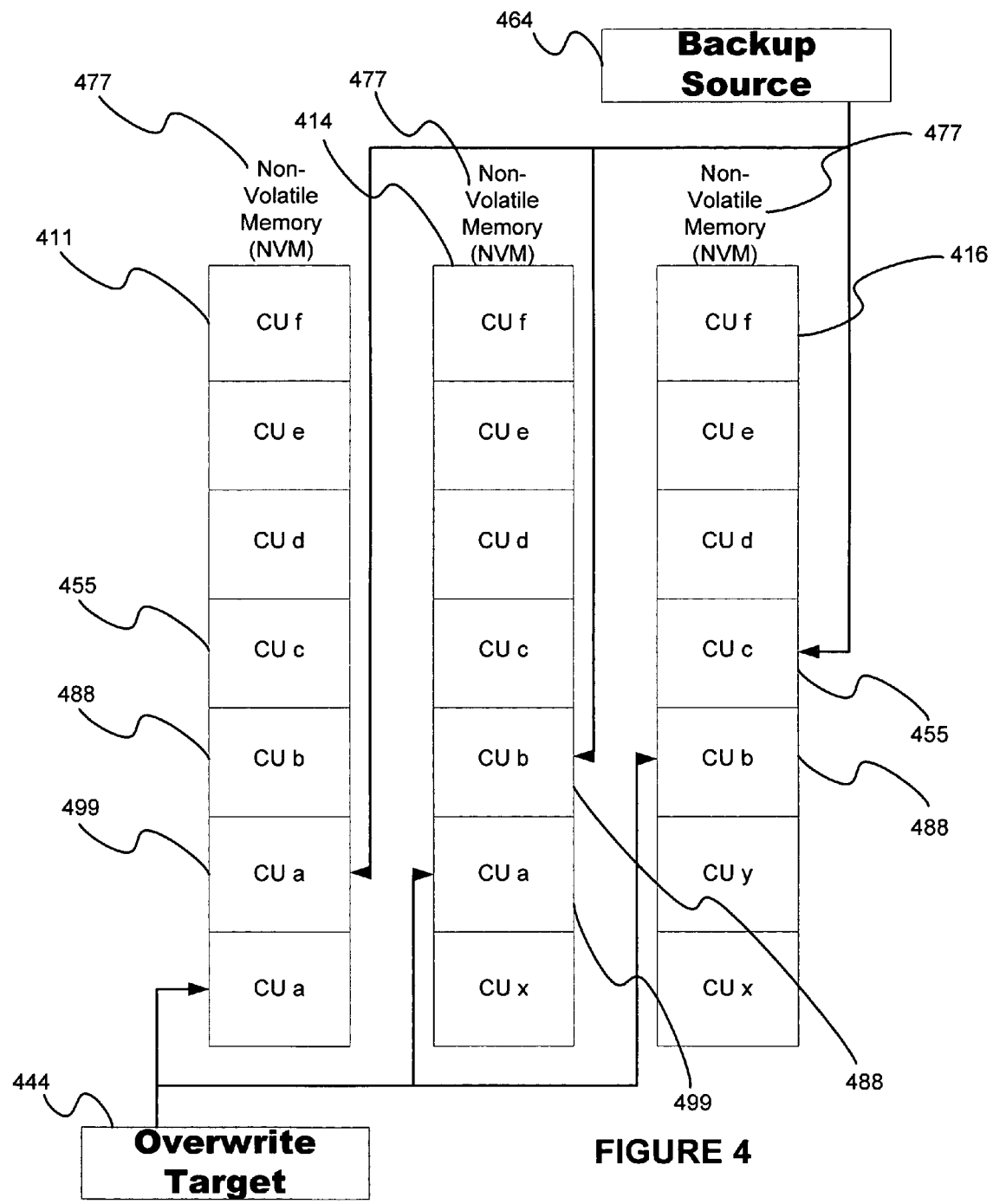
FIG. 4 is a diagram illustrating an exemplary method of preventing loss of information and ensuring continuity of an update procedure by backing up and overwriting at least one compressed block of information during an update of an electronic device in accordance with an embodiment of the present invention.

FIG. 4 is a diagram illustrating an exemplary method of backing up a block of information during an update of an electronic device, for example, the mobile handset 107 illustrated in FIG. 1, in accordance with an embodiment of the present invention. FIG. 4 illustrates a non-volatile memory device 477 (NVM) comprising a plurality of memory blocks 411, 414, and 416 (labeled for example, CU a, CU b, CU c, . . . , CU f). FIG. 4 also illustrates a backup source 464 (e.g., non-volatile memory) memory location and an overwrite target 444 memory location.

Aspects of the present invention may be found in avoiding loss of information and ensuring continuity of an update procedure when performing updates of firmware and/or software components in electronic devices by backing up an updated block of information in a fault tolerant manner.

Updates may be performed on update blocks, for example, 499, 488, and 455, and each update block may be updated independent of other update blocks, i.e., each update block may receive different update information than any other update block. An update block, for example, 499, 488, and 455, may be reconstructed, in the event of update interruption due to a power failure, for example, by evaluating the stored corresponding compressed block stored in backup source 464, for example, or by evaluating information stored where the update block originated (for example, in non-volatile memory 477).

Storing (i.e., backing-up) a compressed block corresponding to a current working update block during the update procedure in backup source 464, for example, may ensure that loss of information is avoided. Therefore, a fault tolerant update may comprise safeguarding update information (i.e., the compressed block stored in backup source 464) so that a current working block (i.e., the block being updated) may be reconstructed should a power failure occur during the update.

Aspects of the present invention may be found in a method of performing a fault tolerant update on an information file (e.g., code/data) in an electronic device. In an embodiment according to the present invention, an information file (i.e., block of information) may be stored in compressed form in non-volatile memory 477, for example, in an electronic device while the decompressed information file (i.e., block of information) is being updated in RAM, for example, RAM 388 illustrated in FIG. 3, during an electronic device update procedure.

In an embodiment according to the present invention, when a compressed block of information is decompressed out of NVM 411 into RAM, for example, RAM 388 illustrated in FIG. 3, a compressed version of the same block may also be written (i.e., stored) in a particular, but temporary, non-volatile memory location, for example, backup source 464, for easy reference during a restart or reboot after a power failure or other update interruption. As each block is subsequently processed, the compressed version of the current working block may be overwritten into an overwrite target 444, for example, block CU a, illustrated in FIG. 4.

Aspects of the present invention may be found in overcoming challenges associated with updating firmware and software applications comprising compressed information. In prior systems, compressed information becomes scrambled and un-correlated. In prior systems, binary differencing technology is inefficient in creating reasonably sized update packages.

Set forth below is a discussion of compression algorithms, a discussion of how compression/compressed information may be introduced into a firmware image, a discussion of integrating compression techniques into an update package generator, and a discussion of integrating compression techniques into an update agent associated with an electronic device according to an embodiment of the present invention.

Typically, NAND-type memories may be employed as a "hard-disk-in-silicon" to store large files that are often compressed. For example, large video files in NAND-type memory may be stored as compressed MPEG files; audio files may be stored as MP3 files, etc. Data files may be compressed/decompressed using LZ compression, for example, or other compression techniques and/or commercial tools such as, for example, zip, PKzip developed by PKWare, Inc., and Winzip developed by WinZip Computing, Inc.

It is not possible to direct-execute program instructions out of NAND-type memory. NAND-type memory comprises a pseudo-serial interface analogous to a hard drive and has a tendency to develop bad blocks/segments and bad bits/fragments over time due to, for example, extended erase cycling.

The code stored in NAND-type memory (similarly to a hard disk drive in a PC) must be shadowed to RAM and executed there instead of being directly executed out of the NAND-type memory. As a result one often sees "64 MB DRAM (dynamic random access memory), 46 MB usable", for example, on device specifications of some electronic devices.

NAND-type memory may be a single-level-cell (SLC) or a multi-level-cell (MLC) type memory. Single-level-cell NAND-type memory may be price competitive with multi-level-cell NAND-type memory. MLC NAND-type memory improves NAND-type memory cost competitiveness (albeit at some tradeoff of even slower random read speed, slower write speed, larger block size, etc). NAND-type memory' cost competitiveness may be derived from a 'chained' serial arrangement of the internal array 'bit' storage transistors enabling a more closely packed arrangement. Additional factors may comprise fewer Input/Output buffers (due to the simpler interface to the outside world), and the assumption that bad bits and blocks exist within NAND-type memory boosting NAND-type memory testing yields. An address may be read in through an Input/Output port over four consecutive clock cycles, for example.

Because NAND-type memory does not support execute-in-place (XIP), information in the NAND-type memory may be compressed and decompressed on-the-fly as part of a transfer-to-DRAM process (with a requisite overall performance drop due to decompression overhead). Software in general, in binary form, for example, may be highly random and therefore may not compress well. In general, a TXT file or a BMP file may have so-called low entropy and may compress better.

A NAND-type memory device may be a 3.3V Electrically Erasable and Programmable Read-Only Memory (NAND-E2PROM) device, for example, and may be organized as 528 bytes×32 pages per block. The number of blocks and pages vary from memory device to memory device. The NAND-type memory device may have a 528-byte static register, allowing program and read data to be transferred between the register and the memory cell array in 528-byte increments. An Erase operation may be implemented in a single block unit, for example, (16 Kbytes+512 bytes or 528 bytes×32 pages).

The NAND-type memory device may be a serial-type memory device using I/O pins for both address and data input/output, as well as for command inputs. Erase and Program operations may be automatically executed, making the NAND-type memory device ideal for applications such as, for example, solid-state file storage, digital voice recording, image storage for digital cameras, and other systems requiring high-density, nonvolatile memory data storage.

For example, 131072 pages may comprise 4096 blocks, i.e., 32 pages may comprise 1 block of data storage. A page may comprise 528 bytes of which 512 bytes may be used for main memory storage and 16 bytes may be used for redundancy or for other uses. One block may comprise 528 bytes× 32 pages comprising (16K+512) bytes or 16512 bytes. An exemplary memory capacity may comprise 528 bytes×32 pages×4096 blocks comprising 69206016 byte or 69 MB.

Researchers in the field of lossless text compression have developed several sophisticated approaches, such as Huffman encoding, arithmetic encoding, the Lempel-Ziv (LZ) family of encoding schemes, Dynamic Markov Compression, Prediction by Partial Matching (PPM), and Burrow-Wheeler Transform-based algorithms (BWT), etc.

LZ-family encoding methods are dictionary-based compression algorithms. Variants of LZ algorithms form the basis of UNIX compression, gzip, and pkzip tools, for example.

PPM is adapted to encode each symbol by considering the preceding k symbols (an "order k" context). PPM may provide better compression than other existing compression algorithms, but PPM is intolerably slow and consumes large amounts of memory to store context information. Several efforts have been made to improve PPM.

BWT is adapted to rearrange the symbols of a data sequence sharing the same unbounded context by cyclic rotation followed by lexicographic sort operations. BWT is adapted to use move-to-front and an entropy coder as a back-end compressor. A number of efforts have been made to improve the efficiency of BWT.

Normal zip compression may be employed for generic content stored in NAND-type memory. Using WinZip, for example, which may be considered a normal ZIP compression, code in NAND-type memory may be compressed. Assuming the operating system (OS) stored in NAND-type memory has approximately a 41% compression ratio, it is possible to get 27 MB of information compressed into 16 MB of space.

Portions of firmware images may be compressed/decompressed. Compression of entire firmware images may also be performed. A compressed firmware image may include code and/or data. One objective of firmware image compression may be to minimize memory space used. Compression of firmware images may be dependent upon the type of code and/or data being compressed and the compression algorithm being employed and/or stored on the electronic device.

To apply compression to a firmware image, the firmware image may be built following a standard building procedure. The firmware image may comprise several components, wherein each component may be built individually. A component to be compressed may be compressed before being assembled into a final firmware image.

Figure 5:
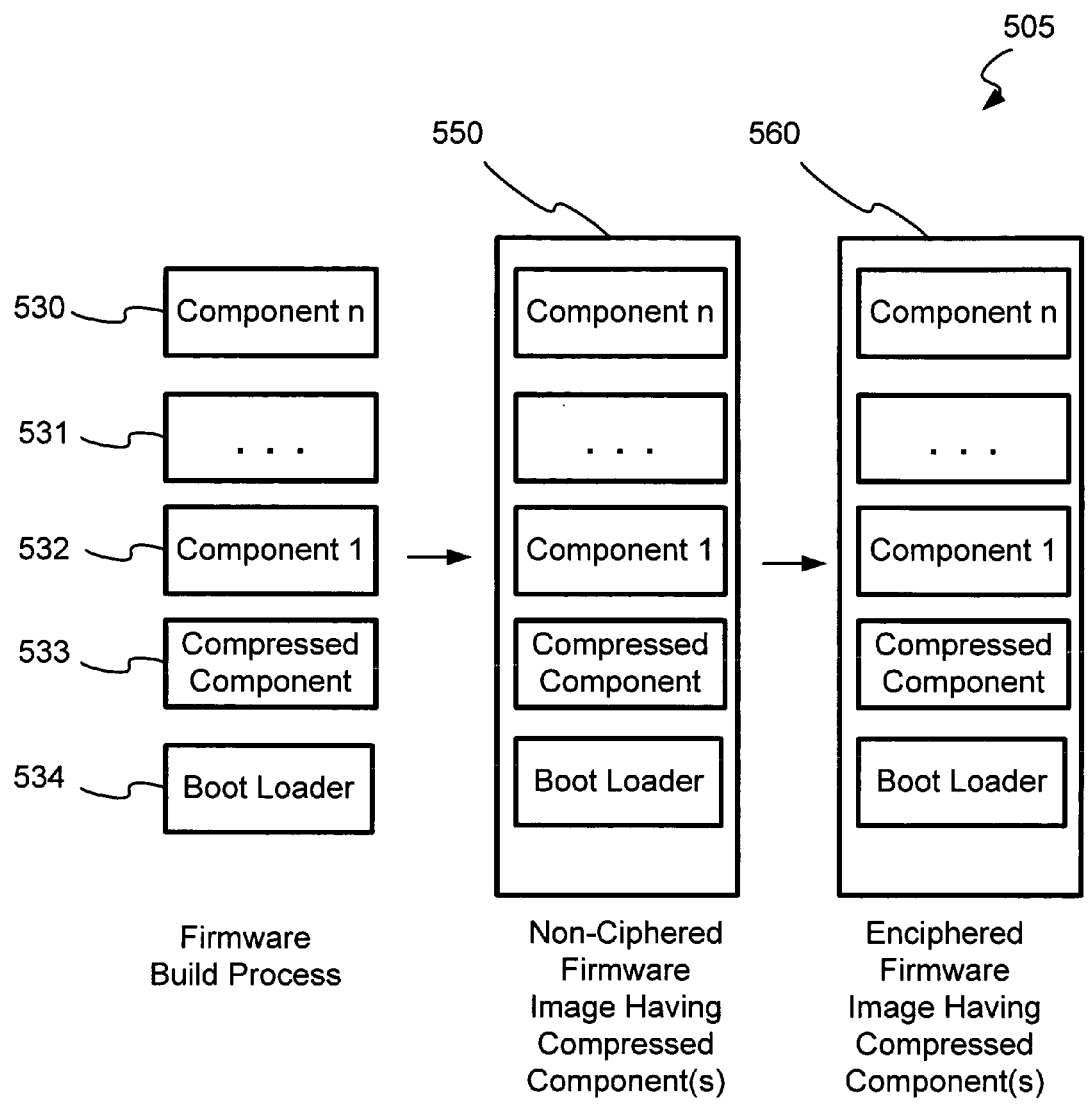
FIG. 5 is a block diagram illustrating an exemplary firmware build process incorporating compression according to an embodiment of the present invention.

FIG. 5 is a block diagram 505 illustrating an exemplary firmware build process that is adapted to encipher a non-ciphered firmware image 550 comprising at least one compressed firmware component 533 according to an embodiment of the present invention. FIG. 5 illustrates building a firmware image 550 comprising a plurality of components. The components may be compressed or decompressed. The components may be non-ciphered and may be enciphered.

The firmware image 550 may comprise at least one compressed component, for example, component 533. In an embodiment according to the present invention, all of the components of firmware image 550 may be compressed. The firmware image 550 may incorporate a plurality of components, for example, a component n 530, a component comprising an ellipsis 531 indicating that the firmware image comprises a plurality of additional components, a component 1 532, a compressed component 533, and a boot loader 534. The component(s) to be enciphered may be compressed before assembly into non-ciphered firmware image 550. After the firmware image 550 is built, the firmware image 550 may be enciphered creating enciphered firmware image 560. The enciphered firmware image 560 may comprise at least one compressed component. In an embodiment according to the present invention, the entirety of components in firmware image 560 may be compressed.

In an embodiment according to the present invention, a non-ciphered firmware image, for example, firmware image 550, may be used to generate binary difference information.

Figure 6:
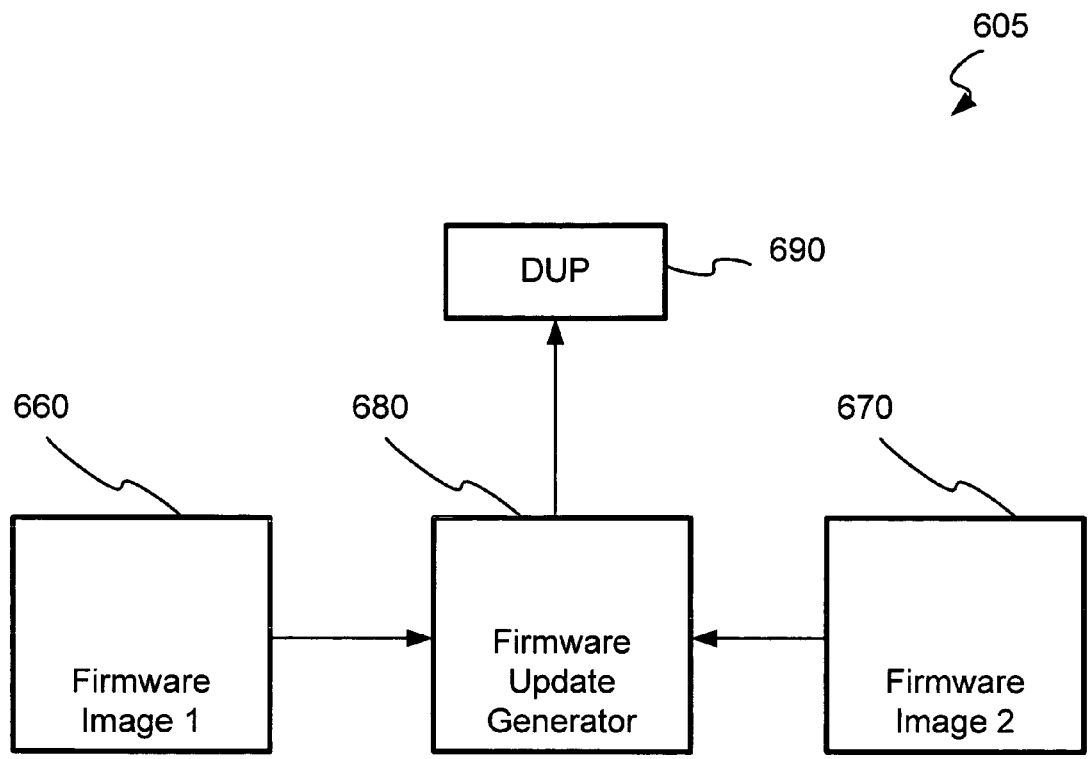
FIG. 6 is a block diagram illustrating an exemplary firmware update generator updating firmware images according to an embodiment of the present invention.

FIG. 6 is a block diagram 605 illustrating an exemplary firmware update generator 680 updating firmware images according to an embodiment of the present invention. In FIG. 6, a method of generating a firmware update package using firmware update generator 680 is illustrated. In an embodiment according to the present invention, the method may comprise creating a data update package (DUP) 690 based upon non-ciphered binary firmware images, for example, firmware image 1 660 and firmware image 2 670 illustrated in FIG. 6, wherein additional information comprising compressed components may be used and included when enciphering firmware images 1 and 2, 660 and 670, during update package generation.

Symmetric enciphering may have little or no impact on the final firmware image size. Stream symmetric enciphering may produce enciphered components having the same size as the non-enciphered components.

Block symmetric enciphering, on the other hand, may introduce extra bytes at the end of the firmware image. The extra bytes may represent padding information, wherein the end of the message may not be aligned with an encipher block boundary. The firmware update generator 680 may be unaffected, because an enciphering/deciphering algorithm/component may be adapted to add/remove padding information.

Original information may also be recovered by employing a compression/decompression algorithm/component. If compression and enciphering are both employed, then original information may be recovered employing an enciphering key (e.g., symmetric or asymmetric) and a enciphering algorithm along with the compression/decompression algorithm/component.

Assuming that compression changes the firmware build process; compressed component(s) of one or both firmware images (the two versions of firmware being used to create the update package) may be lost or misaddressed in memory.

In an embodiment according to the present invention, un-compressed firmware images may be used to generate binary difference information. Before an update may be applied to a decompressed firmware image, compressed update information in compressed update blocks may also be decompressed.

Two possible scenarios exist for generating a data update package (DUP) using an update generator according to an embodiment of the present invention. One embodiment of the present invention may comprise creating the DUP based upon the binary firmware images alone. In another embodiment of the present invention, additional information comprising compressed components may also be employed during update generation. Compressed firmware/software (code/data) ordinarily occupies less space than uncompressed firmware software (code and/or data).

Figure 7:
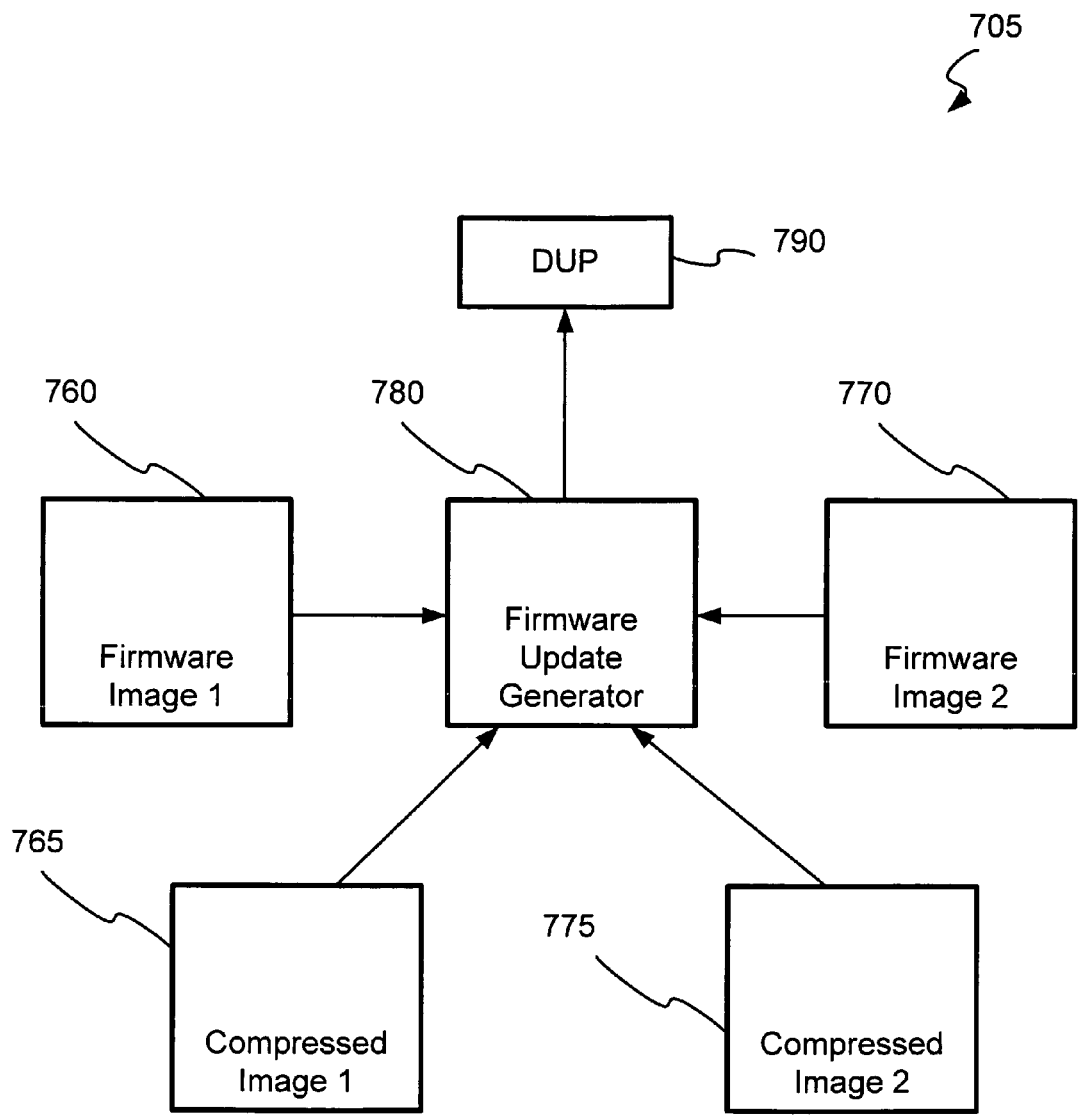
FIG. 7 is a block diagram illustrating an exemplary firmware update generator updating firmware images using compressed firmware images according to an embodiment of the present invention.

FIG. 7 is a block diagram 705 illustrating an exemplary firmware update generator 780 updating firmware images, for example firmware image 1 760 and firmware image 2 770, using compressed firmware images, for example compressed image 1 765 and compressed image 2 775, according to an embodiment of the present invention. Firmware image 1 760 and firmware image 2 770 may also be compressed prior to being updated. In order to perform an update using compressed images (e.g., update and/or original) in an update agent in an electronic device, an embodiment of the present invention may address at least the following three issues: handling compressed information during a pre-check phase; handling compressed information during a check-recovery phase; and handling compressed information using a fault tolerance procedure.

In an embodiment of the present invention, the cyclic redundancy check (CRC) of a firmware image block may be compared during the pre-check phase against an original image CRC stored in the data update package (DUP) 790. The pre-check may de-compress the block before the CRC is calculated, when compressed data is present.

In another embodiment according to the present invention, the CRC values for compressed information may be stored in the DUP 790. However, in the firmware update generator, all images, compressed and decompressed, may be present during data update package (DUP) generation. The check-recovery phase may also perform a CRC comparison.

In the fault tolerance procedure, modifications may be performed wherein a compression/decompression algorithm may be included to facilitate recovery of data for the update.

Figure 8:
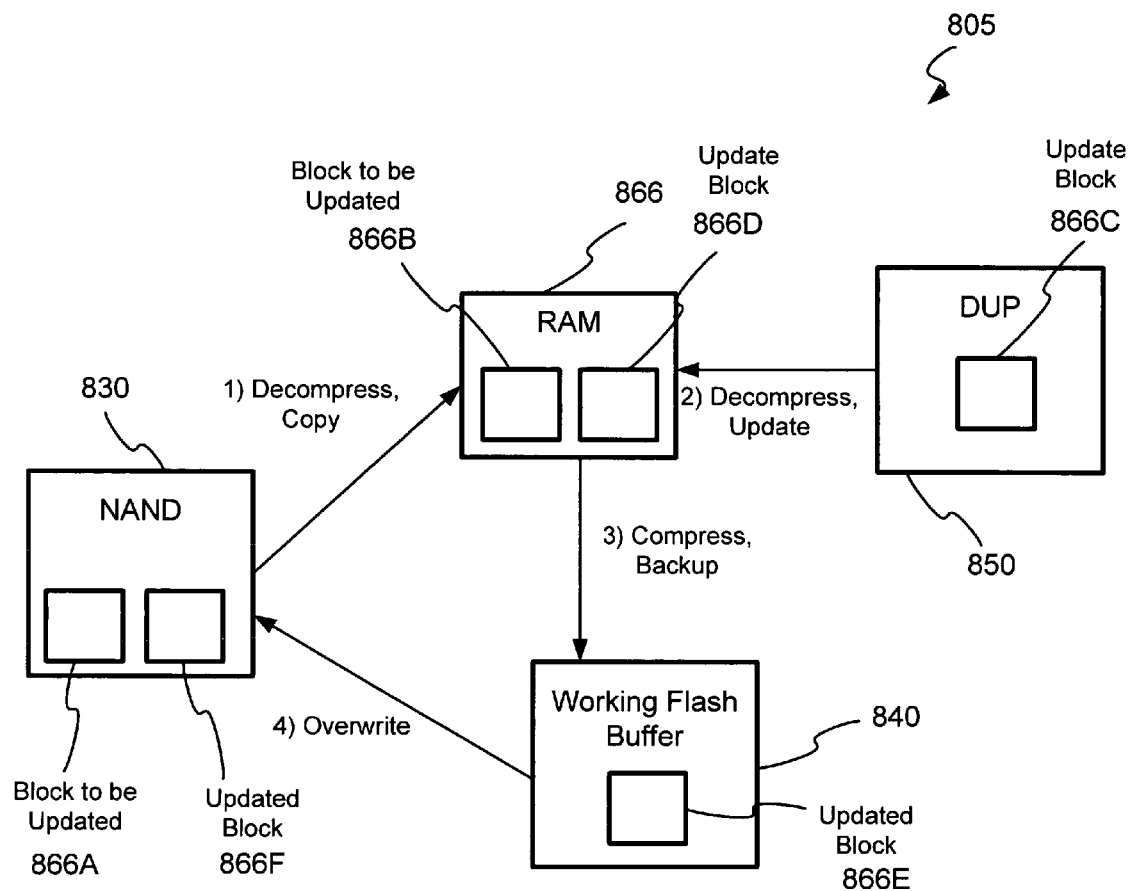
FIG. 8 is a block diagram illustrating a modified update agent fault tolerant update process managing compressed firmware images according to an embodiment of the present invention.

Employing a fault tolerance procedure may comprise modification of the compression/decompression algorithm to facilitate recovery of data and/or code during an update. FIG. 8 below describes a fault tolerant method flow incorporating compression.

FIG. 8 is a block diagram 805 illustrating an exemplary modified update agent fault tolerant update process managing compressed firmware images according to an embodiment of the present invention. In FIG. 8, a non-volatile memory, for example, NAND-type memory 830 may comprise a compressed firmware/software block to be updated 866A.

The compressed firmware/software block 866A may be decompressed into RAM 866 as a decompressed firmware/software block 866B. A compressed update block 866C may also be decompressed from the data update package (DUP) 850 into the RAM 866 as a decompressed update block 866D.

The decompressed firmware/software block 866B may be updated with the update information from the decompressed update block 866D in RAM 866. The updated decompressed firmware/software block 866E may be compressed into a working flash buffer 840, for example.

In an embodiment according to the present invention, the compressed updated data block 866E may be stored into non-volatile memory 830 and/or may be stored into the original location in the NAND-type memory 830 from where the compressed un-updated block (for example 866A) originated prior to being updated. The process illustrated above may be repeated for every data block in NAND-type memory 830 to be updated, depending upon the compression/decompression algorithm.

Aspects of the present invention may be found in a fault tolerant update process. In an embodiment according to the present invention, because the original data block remains intact until the block is overwritten by an updated and compressed update block, the original compressed data block may be used, if necessary, in a re-initiated update process, if an error occurs during update processing. Additionally, the data update package (DUP) also remains intact throughout the update process. If a processing failure or error occurs during the update process, the failure is recoverable and the process may be re-initiated without loss of the original compressed data block or loss of the compressed data update package (DUP).

Figure 9:
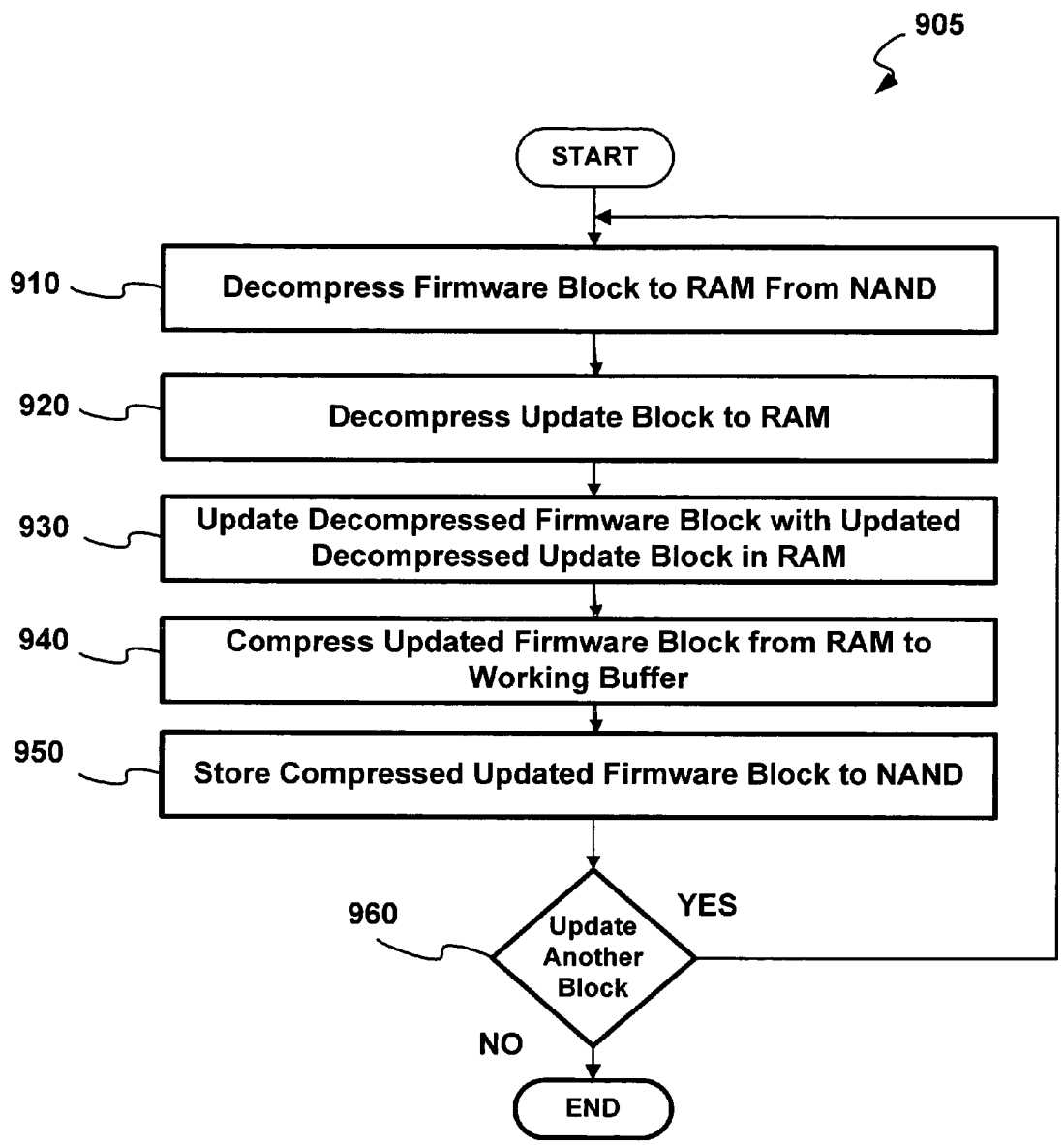
FIG. 9 is a flow diagram illustrating an exemplary method of updating compressed firmware objects according to an embodiment of the present invention.

FIG. 9 is a flow diagram 905 illustrating a method of updating compressed firmware/software objects according to an embodiment of the present invention. In FIG. 9, a compressed firmware/software block to be updated may be decompressed into RAM from a NAND-type memory device (block 910). A compressed update block may also be decompressed out of a DUP into RAM (block 920). The decompressed firmware/software block may be updated employing the decompressed update block in the RAM (block 930). The updated firmware/software block may then be compressed out of RAM into a working buffer (block 940). The compressed updated firmware/software block in the working buffer may be stored into the NAND-type memory in a different location or may be overwritten into the original location from where the compressed un-updated firmware/software block originated (block 950). Updating the compressed firmware/software blocks may continue by processing next data block 960 if blocks to be updated remain. The process may continue until all data blocks are updated.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating a mobile electronic device associated with a communications network, the method comprising:

generating an update comprising at least one update block of update information for updating at least one of firmware and software residing in blocks of memory in the mobile electronic device, wherein at least a portion of the at least one of firmware and software to be updated is stored in a compressed form in the mobile electronic device before and after updating, and wherein generating the at least one update block comprises determining information identifying different split boundaries for splitting the at least one of firmware and software, after updating, into variable-sized blocks that, when compressed, fit into corresponding blocks of uniform size for storage in the memory;

compressing the generated update; and transmitting the compressed update to the mobile electronic device, wherein the update information comprises a set of executable instructions for converting the at least one of firmware and software from a first version to a second version in the mobile electronic device, and wherein the determined different split boundaries information is employed to split blocks of the at least one of firmware and software updated in the mobile electronic device into variable-sized blocks to be compressed into blocks of uniform size for storage in the memory.

2. The method according to claim 1, wherein the at least a portion of the at least one of firmware and software to be updated is decompressed in the mobile electronic device before updating the at least a portion at least one of firmware and software.

3. The method according to claim 1, comprising receiving and storing the update in the mobile electronic device in a compressed form.

4. The method according to claim 1, comprising decompressing the update in the mobile electronic device before updating the at least one of firmware and software.

5. The method according to claim 1, comprising updating at least one decompressed block of the at least one of firmware and software with a decompressed update block in the mobile electronic device.

6. The method according to claim 1, comprising enciphering the compressed update prior to transmitting the update to the electronic device.

7. The method according to claim 1, comprising decompressing the update one block at a time in the mobile electronic device.

8. The method according to claim 1, comprising decompressing the at least a portion of the at least one of firmware and software to be updated one block at a time in the mobile electronic device.

9. The method according to claim 1, comprising compressing a block of the at least one of firmware and software after the block is updated.

10. The method according to claim 1, comprising compressing the updated block of the at least a portion of the at least one of firmware and software into a location where the block of the at least one of firmware and software originated before being updated.

11. A method of updating compressed firmware/software in a mobile electronic device, the method comprising:

transmitting a compressed update block generated by a generator to the mobile electronic device;

decompressing a compressed block of firmware/software to be updated;

decompressing a compressed update block to be used to update the decompressed block of firmware/software;

updating the decompressed block of firmware/software to be updated using the decompressed update block to produce an undated decompressed block of firmware/software, wherein the decompressed update block comprises a set of executable instructions for converting one version of firmware/software to another version of firmware/software in the mobile electronic device;

compressing an amount of the updated decompressed block of firmware/software, according to split boundaries information determined by the generator of the compressed update block to split the updated decompressed block of firmware/software in the mobile electronic device into variable-sized blocks to be compressed to produce a compressed block of updated firmware/software of uniform size; and storing the compressed block of updated firmware/software in one of a plurality of memory blocks of uniform size in the mobile electronic device.

12. The method according to claim 11, comprising decompressing a plurality of blocks of firmware/software and a plurality of update blocks.

13. The method according to claim 11, wherein updating the decompressed block of firmware/software comprises performing a calculation employing information in the decompressed update block and the block of firmware/software to be updated and converting contents of the block of firmware/software based upon the calculation results.

14. The method according to claim 13, wherein performing a calculation comprises calculating binary differencing information between contents of the block of firmware/software to be updated and the update block.

15. The method according to claim 11, wherein decompressing one of the block of firmware/software to be updated and the update block comprises adjusting one of a size or length of the block of information during decompression.

16. The method according to claim 11, wherein compressing the updated block of firmware/software comprises adjusting one of a size or length of the block of information during compression.

17. An electronic device network for updating firmware/software in a plurality of electronic devices using at least one electronic device update, the network comprising:
- at least one server comprising interface circuitry to communicatively couple to the plurality of electronic devices and that, during operation:
  - generates electronic device updates each comprising a set of executable instructions for converting one version of firmware/software to another version of firmware/software in blocks of memory in the plurality of mobile electronic devices, the at least one server comprising a compression/decompression engine to compress the electronic devices updates;
  - stores a plurality of electronic device updates;
  - dispenses the plurality of electronic device updates to the plurality of electronic devices;
  - wherein at least a portion of the firmware/software to be updated in the plurality of electronic devices is decompressed in order to be updated and compressed after being updated; and
  - wherein generating each of the electronic device updates comprises determining information identifying different split boundaries for splitting updated decompressed blocks of firmware/software into variable-sized blocks that, when compressed, fit into corresponding blocks of uniform size for storage in the memory, and wherein the determined different split boundaries information is employed to split blocks of updated firmware/software in the electronic device into variable-sized blocks to be compressed into blocks of uniform size for storage in the memory.

18. The network according to claim 17, wherein the at least one server comprises secure sockets layer support providing authentication and data enciphering/deciphering.

19. The network according to claim 17, wherein each of the plurality of electronic devices are adapted to retrieve compressed updates from the at least one server to update the firmware/software resident in the plurality of electronic devices, and wherein at least a portion of the firmware/software resident in the plurality of electronic devices is compressed.

20. The network according to claim 17, wherein update generation comprises compression and decompression.

21. The network according to claim 17, wherein each of the plurality of electronic devices comprises a compressed section that, during operation, stores a compressed update generated by the at least one server.

22. The network according to claim 17, wherein each of the plurality of electronic devices comprises at least one of a random access memory, a provisioned data section, an operating system, an update agent, and an update application loader.

23. The network according to claim 22, wherein the provisioned data section comprises at least one of an update agent provisioning information section and a number assignment module.

24. The network according to claim 23, wherein the update agent employs compression/decompression components to update at least one of firmware and software resident in the plurality of electronic devices, and wherein at least a portion of the at least one of firmware and software is compressed.

25. The network according to claim 17, wherein the plurality of electronic devices comprises at least one of a mobile cellular phone handset, a personal digital assistant, a pager, a multimedia player, and a camera.

26. The network according to claim 17, wherein the at least one server processes an old memory image and a new memory image, and wherein at least a portion of the at least one of the old memory image and the new memory image is compressed.

27. The network according to claim 17, wherein update generation decompresses one of compressed data segments and compressed code in both an old memory image and a new memory image to generate a compressed update for updating the firmware/software in the plurality of electronic devices, and wherein at least a portion of the firmware/software is compressed.

28. The network according to claim 17, wherein the at least one server employs compression/decompression algorithms to compress a generated update.

29. The network according to claim 17, wherein update generation employs one of a unitary decompression/compression engine and a separate decompression engine and a separate compression engine.

* * * * *

UNITED STATES PATENT AND TRADEMARK OFFICE
CERTIFICATE OF CORRECTION

PATENT NO. : 7,669,195 B1
APPLICATION NO. : 10/909519
DATED : February 23, 2010
INVENTOR(S) : Iyad Qumei It is certified that error appears in the above-identified patent and that said Letters Patent is hereby corrected as shown below:

In column 20, line 45, in Claim 11, delete "undated" and insert -- updated --, therefor.

Signed and Sealed this

Tenth Day of August, 2010

David J. Kappos
*Director of the United States Patent and Trademark Office*